(12) United States Patent
Schwartz et al.

(10) Patent No.: US 12,284,189 B1
(45) Date of Patent: Apr. 22, 2025

(54) LOCATION VERIFICATION SYSTEM AND METHOD OF VERIFYING A LOCATION OF AN ENTITY

(71) Applicant: The Web Genie Inc., Spring Valley, NY (US)

(72) Inventors: Abraham Schwartz, Spring Valley, NY (US); Moses Schwartz, Spring Valley, NY (US)

( * ) Notice: Subject to any disclaimer, the term of this patent is extended or adjusted under 35 U.S.C. 154(b) by 0 days.

(21) Appl. No.: 18/413,429

(22) Filed: Jan. 16, 2024

(51) Int. Cl.
H04L 9/40 (2022.01)

(52) U.S. Cl.
CPC .......... *H04L 63/107* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 6,688,435 B1* | 2/2004 | Will | G07F 17/13 186/35 |
| 11,509,475 B2 | 11/2022 | Mars | |
| 2007/0257774 A1* | 11/2007 | Stumpert | G06Q 10/08 340/7.1 |
| 2015/0139423 A1* | 5/2015 | Hildebrandt | H04W 8/26 455/420 |
| 2015/0193731 A1* | 7/2015 | Stevens | G06Q 10/083 705/26.7 |
| 2016/0224934 A1* | 8/2016 | Ramalingam | G06Q 10/0833 |
| 2016/0358397 A1* | 12/2016 | Kristensen | G07C 9/00309 |
| 2018/0165637 A1* | 6/2018 | Romero | G06Q 10/0836 |
| 2018/0165638 A1* | 6/2018 | Wilkinson | G06F 21/32 |
| 2018/0165639 A1* | 6/2018 | Wilkinson | G07C 9/00896 |
| 2018/0165640 A1* | 6/2018 | Wilkinson | G07C 9/00912 |
| 2018/0174102 A1* | 6/2018 | Winkle | G06Q 10/08355 |
| 2018/0246526 A1* | 8/2018 | Wilkinson | G05D 1/0278 |
| 2019/0259232 A1* | 8/2019 | Nandakumar | G06K 19/06028 |
| 2019/0352933 A1* | 11/2019 | Tartal | E05B 65/02 |
| 2020/0349786 A1 | 11/2020 | Ho | |
| 2021/0125146 A1* | 4/2021 | Tazume | B64D 1/08 |
| 2022/0068078 A1* | 3/2022 | Schmidt | G07F 17/12 |
| 2024/0144167 A1* | 5/2024 | Reznik | G06Q 10/02 |

FOREIGN PATENT DOCUMENTS

| | | | |
|---|---|---|---|
| AU | 2015215965 B2 | 12/2016 | |
| AU | 2017268493 A1 * | 6/2018 | |
| JP | 2002245367 A * | 8/2002 | |
| WO | WO-2022035912 A2 * | 12/2022 | G06K 7/1417 |

* cited by examiner

Primary Examiner — Richard A McCoy
(74) Attorney, Agent, or Firm — Caldwell Intellectual Property Law

(57) ABSTRACT

A location verification system and method of verifying a location of an entity are disclosed. The method includes receiving, using at least a processor, user data related to an entity, wherein the user data includes location data, generating, using the at least a processor, a user profile as a function of the user data, verifying, using the at least a processor, the location data of the user profile, receiving, using the at least a processor, a unique identifier of at least a location identifying component, wherein the unique identifier is associated with the location data of the user profile and verifying, using the at least a processor, a location of the entity by comparing geolocation data of a user device and the location data associated with the unique identifier.

20 Claims, 4 Drawing Sheets

LOCATION VERIFICATION SYSTEM AND METHOD OF VERIFYING A LOCATION OF AN ENTITY

FIELD OF THE INVENTION

The present invention generally relates to the field of location verification. In particular, the present invention is directed to location verification system and method of verifying a location of an entity.

BACKGROUND

In recent years, the proliferation of location-based services and the increasing reliance on mobile devices for various applications have underscored the critical need for robust and secure location verification systems. Existing location verification systems often face challenges in providing both precision and security are not sufficient.

SUMMARY OF THE DISCLOSURE

In an aspect, a method of verifying a location of an entity is disclosed. The method includes receiving, using at least a processor, user data related to an entity, wherein the user data includes location data, generating, using the at least a processor, a user profile as a function of the user data, verifying, using the at least a processor, the location data of the user profile, receiving, using the at least a processor, a unique identifier of at least a location identifying component, wherein the unique identifier is associated with the location data of the user profile and verifying, using the at least a processor, a location of the entity by comparing geolocation data of a user device and the location data associated with the unique identifier.

In another aspect, a location verification system is disclosed. The location verification system includes at least a processor and a memory communicatively connected to the at least a processor, wherein the memory contains instructions configured the at least a processor to receive user data related to an entity, wherein the user data includes location data, generate a user profile as a function of the user data, verify the location data of the user profile, receive a unique identifier of at least a location identifying component, wherein the unique identifier is associated with the location data of the user profile and verify a location of the entity by comparing geolocation data of a user device and the location data associated with the unique identifier.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a location verification system and method of verifying a location of an entity are disclosed. The method includes receiving, using at least a processor, user data related to an entity, wherein the user data includes location data, generating, using the at least a processor, a user profile as a function of the user data, verifying, using the at least a processor, the location data of the user profile, receiving, using the at least a processor, a unique identifier of at least a location identifying component, wherein the unique identifier is associated with the location data of the user profile and verifying, using the at least a processor, a location of the entity by comparing geolocation data of a user device and the location data associated with the unique identifier.

Figure 1:
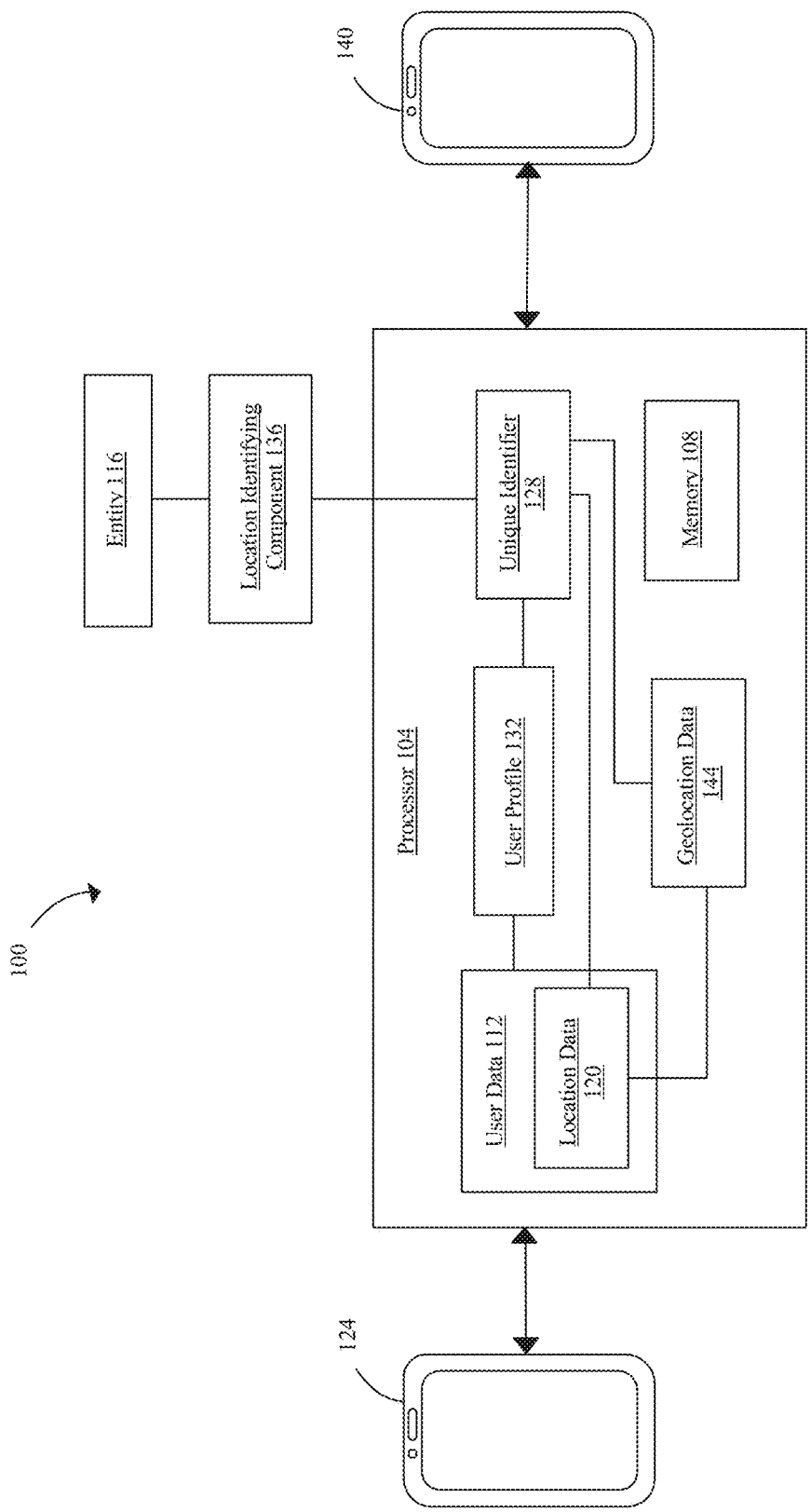
FIG. 1 illustrates an exemplary embodiment of a location verification system.

Referring now to FIG. 1, an exemplary embodiment of a location verification system 100 is illustrated. System 100 may include at least a processor 104. Processor 104 may include, without limitation, any processor 104 described in this disclosure. Processor 104 may be included in a computing device. Processor 104 may include any computing device as described in this disclosure, including without limitation a microcontroller, microprocessor 104, digital signal processor 104 (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory 108 between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor 104 cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may include a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive user data 112 related to an entity 116. For the purposes of this disclosure, "user data" is information related to a user. For example, and without limitation, user data 112 may include name, gender, date of birth, residency, religion, organ donation, occupation, family, contact information, emergency contact, and the like. User data 112 includes location data 120. For the purposes of this disclosure, "location data" is information pertaining to geography. As a non-limiting example, location data 120 may include an address of a user or entity 116. As another non-limiting example, location data 120 may include location data 120 may include coordinates, such as latitude and longitude) of location of a user or entity 116. As another non-limiting example, user data 112 may include communication data. For the purposes of this disclosure, "communication data" is information pertaining to communication between a user and a third party. As a non-limiting example, communication data may include any note, comment, or the like input by a user for a third party. For example, and without limitation, communication data may include an instruction for delivery. As a non-limiting example, third party may include a visitor, delivery person, or the like.

With continued reference to FIG. 1, in some embodiments, user data 112 may be retrieved from a database. In some embodiments, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, user data 112 may be received from a user device 124. For the purposes of this disclosure, a "user device" is a tool or system used by a user to authenticate the geographical position of an entity. As a non-limiting example, user device 124 may include tablet, mobile phone, smart phone, smart watch, or the like. For the purposes of this disclosure, a "user" is an individual, group, or organization that is related to an entity. As a non-limiting example, user may include residents of a building (entity 116), or the like. In a non-limiting example, user may manually input user data 112 using user device 124. In some embodiments, user device 124 may include a scanning device to scan unique identifier 128. The unique identifier 128 disclosed herein is further described below. For the purposes of this disclosure, a "scanning device" is a device for scanning a unique identifier. In some embodiments, scanning device may include an illumination system, a sensor, and a decoder. The sensor in scanning device may detect the reflected light from the illumination system and may generate an analog signal that is sent to the decoder. The decoder may interpret that signal, validate unique identifier using the check digit, and convert it into text. This converted text may be delivered by scanning device to a computing device holding a database of any information of a user or entity. As a non-limiting example, scanning device may include a pen-type reader, laser scanner, camera-based reader, CCD reader, omni-directional barcode scanner, and the like. For example without limitation, scanning device may include a mobile device with an inbuild camera such as without limitation, a phone, a tablet, a laptop, and the like. For example without limitation, a user or third party may use a camera on a phone to scan a QR code. In some embodiments, scanning device may include wired or wireless communication.

With continued reference to FIG. 1, in some embodiments, scanning device may include a radio frequency identification (RFID) reader. For the purposes of this disclosure, a "radio frequency identification reader" is a device that emits radio waves and receives data transmitted by an RFID tag. In some embodiments, the RFID reader may be connected to a computer device or at least a processor that can process the data received from the RFID tag. For the purposes of this disclosure, "radio frequency identification tag" is a small electronic device that contains a unique code and can be attached to or embedded in an entity or location identifying component. RFID tag may also be referred as an RFID transponder. In some embodiments, RFID tag may include a passive RFID tag or active RFID tag. For the purposes of this disclosure, a "passive RFID tag" is an RFID tag that doesn't have its own power source and relies on the energy from RFID reader to transmit its data. For the purposes of this disclosure, an "active RFID tag" is an RFID tag that has its own power source and can transmit its data without relying on an RFID reader's energy. In some embodiments, RFID tag may be implemented on an entity 116 or location identifying component 136. When an RFID tag comes into the range of RFID reader, RIFD tag may receive radio waves emitted by RFID reader and may use the energy from the waves to transmit its unique code back to RFID reader. RFID reader then may capture the unique code and may send it to a computer device and/or at least a processor, which can use it for various purposes such as verifying location of entities, users or third parties, location identifying component 136, user device 124, remote device 140, or the like.

With continued reference to FIG. 1, in some embodiments, user may input data through user interface of user device 124. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 104. For example, a smart phone, smart tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, memory 108 contains instructions configuring processor 104 to generate a user profile 132 as a function of user data 112. For the purposes of this disclosure, a "user profile" is a representation of information and/or data describing information associated with a user. In some embodiments, user may manually generate user profile 132 or may be created by a processor. As a non-limiting example, user profile 132 may include user data 112, location data 120, communication data, or the like. In some embodiments, user profile 132 may be retrieved from database.

With continued reference to FIG. 1, in some embodiments, processor 104 may be configured to encrypt or decrypt user data 112 or user profile 132. In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, memory 108 contains instructions configuring processor 104 to verify location data 120 of user profile 132. As a non-limiting example, processor 104 may implement address validation application programming interface (API) or map APIs to verify location data 120 of user profile 132. In some embodiments, processor 104 may implement a database that stores addresses and compare the stored addresses from the database and location data 120 to verify location data 120. In a non-limiting example, processor 104 may verify the format, accuracy, and existence of location data 120. In some embodiments, processor 104 may compare location data 120 against a database containing other addresses already associated with user profiles 132. If the address is already in the database, the verification may fail. In some embodiments, may, as part of verifying or collecting geolocation data 144, switch a mock location setting in an operating system to "off." In some embodiments, as part of verifying or collecting geolocation data 144, processor 104 may verify geolocation data 144 using direction-of-arrival sensing. "direction-of-arrival sensing," for the purposes of this disclosure, is a method of tracking a direction from which a GPS signal is received. GPS signals are typically received from multiple locations at once, where as a spoofed GPS signal is commonly received from one location only.

With continued reference to FIG. 1, memory 108 contains instructions configuring processor 104 to receive a unique identifier 128 of at least a location identifying component 136. Unique identifier 128 is associated with location data 120 of user profile 132. For the purposes of this disclosure, a "location identifying component" is an element of system 100 that pinpoints the position of an entity. In some embodiments, location identifying component 136 may include paper, plastics, glass, metals, ceramics, alloys, polymers, wood, aluminum, or the like. As a non-limiting example, location identifying component 136 may include printed paper, laminated paper, or the like. As another non-limiting example, location identifying component 136 may include electronic device, or the like. For example, and without limitation, location identifying component 136 may include processor and memory communicatively connected to processor. In some embodiments, location identifying component 136 may include various shape. As a non-limiting example, location identifying component 136 may include a circle, rectangle, square, triangle, or any shape thereof, for instance as a horizontal cross-sectional form. In some embodiments, processor 104 receive unique identifier 128 and/or location identifying component 136 from an external computing device, processor or system. In some embodiments, user may receive unique identifier 128 and/or location identifying component 136 in the form of mail, email, or the like. In some embodiments, processor 104 may receive unique identifier 128 and/or location identifying component in the form of mail, email, or the like. In some embodiments, location identifying component 136 may include a housing. As used in this disclosure, a "housing" refers to an outer structure configured to contain a plurality of components. As a non-limiting example, housing may contain location identifying component 136. In some cases, the housing may include a durable, lightweight material such as without limitation, plastic, metal, and/or the like. In some embodiments, housing may be designed and configured to protect sensitive components of location identifying component 136 from damage or contamination. In some embodiments, location identifying component 136 and/or housing may be portable. For the purposes of this disclosure, a "portable" refers to the capability for an object to be carried or moved. In some embodiments, location identifying component 136 and/or housing may be waterproof.

With continued reference to FIG. 1, in some embodiments, location identifying component 136 and/or housing can be connected to an entity 116. In a non-limiting example, location identifying component 136 and/or housing may be removable attached to entity. For example, and without limitation, location identifying component 136 and/or housing may be attached to entity 116 using magnets, snap-fit connections, engineering fit connections, threading, screws, bolts, hook and loop fasteners, clamps, or the like. In another non-limiting example, location identifying component 136 and/or housing may be permanently attached to entity 116. For example, and without limitation, location identifying component 136 and/or housing may be embedded on entity 116. For example, and without limitation, location identifying component 136 and/or housing may be attached to entity 116 using adhesives. For example, and without limitation, location identifying component 136 that includes laminated paper form, may be attached to a door (entity 116) using adhesives; in some instances, this may be detached from entity 116 as desired. For the purposes of this disclosure, an "entity" refers to a physical object. As a non-limiting example, entity 116 may include tangible and physical objects. For example, and without limitation, entity 116 may include a chair, door, entrance gate, book, device, or the like. As another non-limiting example, entity 116 may include a living organism. For example, and without limitation, entity 116 may include a human, animals, individual, group, organization, or the like. In some embodiments, system 100 may include a plurality of location identifying component 136. In a non-limiting example, system 100 may include a first location identifying component attached on a first entity and a second location identifying component attached on a second entity. For example, and without limitation, first location identifying component may be attached on a main building door (first entity) of a user's apartment (location) and second location identifying component may be attached on a user's personal apartment door (second entity) of the apartment (first location). For example, and without limitation, first location identifying component may be attached on a car (entity 116) of a user (first location) and second location identifying component may be attached on an entrance door (entity 116) of a house (second location).

With continued reference to FIG. 1, location identifying component 136 and/or housing may include output component. In a non-limiting example, output component may include a display. In some embodiments, display may include different technologies, such as liquid crystal display (LCD), a light-emitting diode (LED), organic light-emitting diode (OLED), plasma, projection, touch screen, and/or the like. In some embodiments, display may include varying resolutions, sizes, and aspect ratios. In some embodiments, display may be configured to display unique identifier 128, user profile 132, or location data 120. Unique identifier 128, user profile 132, and location data 120 disclosed herein are further described below. In another non-limiting example, output component may include an audio device. For the purposes of this disclosure, an "audio device" is a device that outputs audio information or data. As a non-limiting example, audio output device may include a speaker, headphones, or a wireless headset, or the like. For the purposes of this disclosure, a "speaker" is a device that converts electrical signals into sound waves that can be heard by the human ear. In another non-limiting example, output component may include a tactile device. For the purposes of this disclosure, a "tactile device" is a device that outputs information that is intelligible using the sense of touch. Tactile device may include a haptic device such as a vibrator. In some embodiments, tactile device may produce patterns having geometric forms that are intelligible to a user using the sense of touch; for instance, tactile device may output letters in braille using a set of retractable pins or bumps that can be extended and retracted to form braille characters, similarly to devices used with screen readers. Tactile device may output other recognizable shapes, such as directional arrows or geometric forms; tactile device may, as another example, output a map vignette of the immediate area. Output component may be coupled to a mobile device; for instance, location identifying component 136, user device 124 and/or remote device 140 may include a mobile device, output component may be coupled to the same mobile device. The user device 124 and remote device 140 disclosed herein is further described below. Output component may be incorporated wholly or in part in a mobile device; for instance, output component may include the display and speakers of the mobile device, as well as a tactile output device coupled to location identifying component 136. Output component may be coupled directly to wireless receiver, or may communicated with wireless receiver via a network; output component may be incorporated in or include a computing device and/or any element thereof, including without limitation a processor, wireless or wired communication input/output devices, navigation facilities, and the like. Output component may be configured to receive data from user device 124 and/or remote device 140; data may be received from location identifying component 136, user device 124 and/or remote device 140 by any suitable electronic or wireless means. Output component may be configured to provide the received data to a user. In some embodiments, providing data signifies presenting the data to a user in a form in which the user can understand the data; for instance, if the user has some visual impairment but is capable of reading large type or similarly accentuated directional features such as large directional arrows, providing data may include displaying large type on a display, such as a mobile phone or tablet screen, or displaying large symbols such as directional arrows on display. Similarly, if the user is visually impaired but able to hear, providing data may involve presenting the data by means of an audio device. Where a user is not able to see or hear, presenting the wayfinding data may include providing data using a tactile device. Providing data may also involve a combination of the above-described means; for instance, the wayfinding data may be presented to the user in audio form, combined with large displays of directional arrows or type, or with tactile information. In a non-limiting example, output component may output location data 120, user profile 132, or the like.

With continued reference to FIG. 1, in some moments, location identifying component 136 and/or housing may include an input component. As a non-limiting example, input component may include a camera. As used in this disclosure, a "camera" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object (e.g., a user or user's eyes). In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. In a non-limiting example, camera may capture image data related to a user, user device 124, remote device 140, or the like. For example, and without limitation, location identifying component 136 may obtain an image of a unique identifier 128 from remote device 140 using camera. For example, and without limitation, location identifying component 136 may obtain an image of a face of a user of remote device 140. For example, and without limitation, location identifying component 136 may obtain an image of a face of a user of user device 124. In another non-limiting example, input component may include touch screen. For example, and without limitation, a user may input any data or use a user interface of location identifying component 136 to obtain data using touch screen.

With continued reference to FIG. 1, for the purposes of this disclosure, a "unique identifier" is an identifier that is unique for an object among others. In some embodiments, unique identifier 128 may be configured to uniquely identify a user, location of an entity 116, location of location identifying component 136, or the like. As a non-limiting example, unique identifier 128 may include a universal product code (barcode), radio-frequency identification (RFID), cryptographic hashes, primary key, a unique sequencing of alpha-numeric symbols, or anything of the like that can be used to identify location data 120. For the purposes of this disclosure, a "universal product code" is a method of representing data in a visual, machine-readable form. In an embodiment, the universal product code may include linear barcode. For the purposes of this disclosure, "linear barcode," also called "one-dimensional barcode" is a barcode that is made up of lines and spaces of various widths or sizes that create specific patterns. In another embodiment, the universal product code may include matrix barcode. For the purposes of this disclosure, "matrix barcode," also called "two-dimensional barcode" is a barcode that is made up of two dimensional ways to represent information. As a non-limiting example, the matrix barcode may include quick response (QR) code, and the like. Unique identifier 128 may take the form of any identifier that uniquely corresponds to the purposes of system 100; this may be accomplished using methods including but not limited to Globally Unique Identifiers (GUIDs), Universally Unique Identifiers (UUIDs), or by maintaining a data structure, table, or database listing all transmitter identifiers and checking the data structure, table listing, or database to ensure that a new identifier is not a duplicate. In another embodiment, unique identifier 128 may be used to identify or verify location of entity 116 or location identifying component 136. In an embodiment, unique identifier 128 may include a printed form. As a non-limiting example, unique identifier 128 may be printed and stuck on an entity 116. As another non-limiting example, unique identifier 128 may be printed and tagged an entity 116. As another non-limiting example, a user may have a printed unique identifier 128 on a paper. In another embodiment, unique identifier 128 may include a digital form. As a non-limiting example, a user may find unique identifier 128 on a phone screen, tablet, computer screen, or any display device thereof of location identifying component 136, user device 124, remote device 140, or the like.

With continued reference to FIG. 1, in some embodiments, location identifying component 136 may include an electromagnetic code device. For the purposes of this disclosure, an "electromagnetic code device" is a device that outputs a signal using electromagnetic radiation; signal may be sent using any frequency usable in communication, including without limitation radio waves, microwaves, infrared waves, and visible light. In some embodiments, electromagnetic code device may include an antenna. In some embodiments, electromagnetic code device may include a passive transmitter, such as those used for passive radio frequency identification ("RFID") or near field communication ("NFC") tags. In some embodiments, a passive transmitter includes an antenna in which electric current is induced by magnetic coupling from an antenna, such as antenna of remote device; the induced electric current may power the passive transmitter, which may use additional circuitry such as a logic circuit to analyze the signal and generate a response signal. In some embodiments, electromagnetic code device may output signal by modifying electromagnetic radiation using means other than an antenna. For instance, electromagnetic code device may absorb and/or reflect ambient or directed electromagnetic radiation in visible or other spectra; electromagnetic code device may emit and/or reflect such electromagnetic radiation in spectrally altered pattern that may be detected using a code reader, antenna, or other device or component of remote device. This may be accomplished, in a non-limiting example, using one or more pigments disposed on a surface of electromagnetic code device; one or more pigments may include, as a non-limiting example, two or more contrasting pigments, which may be provided in a one-dimensional or two-dimensional distribution. Non-limiting examples of such pigmented arrangements may include quick-read codes and/or universal product codes, as rendered on physical objects, electronic displays, and the like.

With continued reference to FIG. 1, electromagnetic code device may include an active transmitter. An active transmitter may be a transmitter having a power source other than an interrogation signal; power source may be any power source as described above. An active transmitter may use an antenna to broadcast a signal periodically. An active transmitter may use an antenna to listen for incoming signals and transmit in response to a detected signal. Active transmitter may perform both actions; for instance, active transmitter may periodically transmit a first signal, and also transmit one or more second signals in response to signals electromagnetic code device receives. electromagnetic code device may include a transceiver, which may be any transceiver as described above. Electromagnetic code device may include a beacon using any beacon protocol as described above.

With continued reference to FIG. 1, electromagnetic code device may include a memory. Memory may be any memory as described below. In some embodiments, memory is read-only. In other embodiments, memory may be writable. The writable memory may require authentication; for instance, the writable memory may be writable only given a password, identifier, key, or other data indicating that the device that will be modifying the memory is authorized. Memory may include any combination of the above; for instance, memory may include a read-only section. Memory may include a writable section with limited access. Memory may include a writable section with general access, to which any user may be able to write data. Memory may include the read-only section and the generally writable section, or the limited access writable section and the generally writable section, or the read-only section and the limited access section. The limited access section may be limited to users of system 100, or in other words may be generally writable, but only to users of the system 100, who may have the requisite access codes as a result of joining the system 100 as users; the users may alternatively be granted the access codes by the system 100 to update information on electromagnetic code device only when authorized by the system, and otherwise be unable to update the memory; in this way, the system 100 may be able to update information on electromagnetic code device memory efficiently by way of the receiver while maintaining security against misuse of the memory. In some embodiments, preventing users from being able to write over memory enables the memory to be free from intentional or unintentional corruption or inaccuracy, and enables the system 100 to ensure that certain information is always available to users of electromagnetic code device. In some embodiments, writable sections enable the system 100 itself or users of the system 100 to correct, augment, or update information as described in further detail below.

With continued reference to FIG. 1, at least an electromagnetic code device may be configured to transmit a signal. Signal may be a return signal in response to a prompt by another wireless communication device, including without limitation remote device. Signal may be a return signal in response to interrogation by an interrogator included in another wireless communication device, including without limitation remote device. Signal may be any wirelessly transmitted signal, including without limitation any signal transmitted through electromagnetic radiation, magnetic coupling, capacitive or other electronic coupling, or any other wireless means. Signal may include a location; identifier may identify at least an electromagnetic code device, an item to which wireless signal is attached and/or with which wireless signal is associated, a location at which electromagnetic code device is located, or the like.

With continued reference to FIG. 1, memory 108 contains instructions configuring processor 104 to verify a location of entity 116 by comparing geolocation data 144 of a user device 124 and location data 120 associated with a unique identifier 128. As a non-limiting example, processor 104 may be configured to verify location data 120 of user profile 132 or location data 120 associated with unique identifier 128 of location identifying component 136 by comparing the location data 120 with geolocation data 144 of user device 124. A "geolocation," as used in this disclosure, is any global position system (GPS) of a device or an entity. In a non-limiting example, geolocation data 144 may be obtained using global positioning system (GPS), Wi-Fi triangulation, cellular triangulation, or the like. For example, and without limitation, satellite-based navigation system may provide geolocation data 144 for user device 124 equipped with GPS receivers. As a non-limiting example, geolocation data 144 may include coordinates of the location of user device 124.

With continued reference to FIG. 1, in some embodiments, location data 120 of entity 116 may be verified by comparing location data 120 to a proof of address document. For the purposes of this disclosure, a "proof of address document" is an official record that demonstrates an individual's address. As a non-limiting example, proof of address document may include utility bill, bank statement, government issued identification (ID), lease agreement, employment letter, or the like. As a non-limiting example, location data 120 may be verified manually by an individual or organization, who is an expert or who provides system 100 to a user. As another non-limiting example, location identifying component 136 or user device 124 may verify location data 120 of entity 116 using optical character recognition (OCR). For the purposes of this disclosure, "optical character recognition" is a technology that enables the recognition and conversion of printed or written text into machine-encoded text. In some cases, location identifying component 136 or user device 124 may recognize a keyword using OCR to find location data 120 in a proof of address document. As used in this disclosure, a "keyword" is an element of word or syntax used to identify and/or match elements to each other. As a non-limiting example, keyword may include location (location data 120) of a user or entity 116. In some cases, at least a processor may transcribe much or even substantially all document.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from document may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of document. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the document to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes document. Since the adaptive classifier may have learned something useful a little too late to recognize characters on the first pass, a second pass may be run over the document. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, location identifying component 136 may display unique identifier 128. As a non-limiting example, location identifying component 136 may display unique identifier 128 using display. In a non-limiting example, unique identifier 128 may be constantly displayed on display of location identifying component 136 or a user or third party may engage with a display of location identifying component 136 through tactile interaction, such as touch, in order to access and view unique identifier 128. As another non-limiting example, location identifying component 136 may display unique identifier 128 as location identifying component 136 includes a laminated paper with unique identifier 128 on the paper. In some embodiments, location identifying component 136 may display user data 112 or user profile 132. As a non-limiting example, location identifying component 136 may display a user's name, communication data, location data 120, unique identifier 128, or the like.

With continued reference to FIG. 1, in some embodiments, processor 104 may be configured to transmit location data 120 as a function of unique identifier 128 to a remote device 140. In some embodiments, processor 104 may be configured to verify a location of an entity 116 as a function of location data 120 associated with a unique identifier 128. For the purposes of this disclosure, a "remote device" is a tool or system used by a third party to authenticate the geographical position of an entity or third party. For the purposes of this disclosure, a "third party" is an individual group, or organization that who visits an entity for a specific purpose or duration. As a non-limiting example, third party may include a visitor, delivery person, or the like. As a non-limiting example, remote device 140 may include tablet, mobile phone, smart phone, smart watch, or the like. For example, and without limitation, remote device 140 may include processor and memory communicatively connected to processor. In a non-limiting example, third party may verify the location (location data 120) of entity 116 or location identifying component 136 by engaging with a display of remote device 140 through tactile interaction, such as touch or pushing button. In another non-limiting example, third party may verify the location (location data 120) of entity 116 or location identifying component 136 by engaging with a display of location identifying component 136 through tactile interaction, such as touch or pushing button. In some embodiments, remote device 140 may include a scanning device to scan unique identifier 128. Scanning device disclosed herein is further described above. As a non-limiting example, third party may scan unique identifier 128 displayed on location identifying component 136 using scanning device and obtain information related to location data 120 or user profile 132 embedded in unique identifier 128. In a non-limiting example, remote device 140 may be configured to scan unique identifier 128 to obtain user data 112. In some embodiments, remote device 140 may be configured to verify a location of the remote device as a function of location data 120 associated with unique identifier 128. For example, and without limitation, a third party may verify the location of the third party by scanning unique identifier 128 of location identifying component 136 using remote device 140 as the unique identifier 128 may be embedded with location data 120 of location identifying component 136, indicating the location of the location identifying component 136, entity 116, third party and remote device 140.

With continued reference to FIG. 1, in some embodiments, processor 104 may verify the location of remote device 140 by comparing an interaction address and location data 120 embedded in unique identifier 128. For the purposes of this disclosure, an "interaction address" is the physical location of an entity that requires a third party to visit in person for engagement. As a non-limiting example, interaction address may include a delivery address that a delivery person (third party) has to deliver a package to a user or entity 116. In a non-limiting example, a third party may manually compare interaction address and location data 120. In some embodiments, remote device 140 may compare interaction address and location data 120 using a language processing module. The language processing module may be configured to extract one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by processor and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in some embodiments, processor 104 may be communicatively connected to a locking mechanism of entity 116. In some embodiments, processor 104 may be configured to control locking mechanism of entity 116 as a function of verification of location of remote device 140. For the purposes of this disclosure, a "locking mechanism" is the system or device secures and controls access to an entity. As a non-limiting example, locking mechanism may include lock cylinder, keyway, latch, deadbolt, actuator, or the like. For example, and without limitation, locking mechanism may include a door lock. In some embodiments, locking mechanism may be manual or automated using at least an actuator. For the purposes of this disclosure, an "actuator" is a component of a machine that is responsible for moving and/or controlling a mechanism or system. Actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, actuator may have an energy or power source other than control signal. This may include a main energy source, which may include for example electric power, hydraulic power, pneumatic power, mechanical power, and the like. In some cases, upon receiving a control signal, actuator may respond by converting source power into mechanical motion. In some cases, actuator may be understood as a form of automation or automatic control. In some embodiments, processor 104 may be configured to control locking mechanism of entity 116 as function of verification of location of remote device 140. In a non-limiting example, processor 104 may control at least an actuator of locking mechanism to lock or unlock a lock of an entity 116 as interaction address and location data 120 matches. In another non-limiting example, processor 104 may control at least an actuator of locking mechanism of entity 116 as remote device 140 verifies the location of remote device 140. In another non-limiting example, processor 104 may control at least an actuator of locking mechanism of entity 116 as user device 124 verifies the location of location identifying component 136.

With continued reference to FIG. 1, in some embodiments, processor 104 may generate a verification alert as a function of a verification of location of entity 116. For the purposes of this disclosure, a "verification alert" is an indication to inform a user or third party related to a location verification. In some embodiments, verification alert may include audio, text, image, vibration, and the like. In some embodiments, verification alert may include a text message, email, notification sound, phone call, notification banner, application notification, or the like. In some embodiments, verification alert may be generated at specific time intervals and frequencies. In a non-limiting example, processor 104 may generate verification alert as geolocation data 144 and location data 120 matches or proof of address document and location data 120 matches. In some embodiments, processor 104 may generate verification alert as a function of verification of location of remote device 140. In a non-limiting example, processor 104 may generate verification alert as interaction address and location data 120 matches. In some embodiments, user device 124 may receive verification alert as the verification of location of remote device 140. In a non-limiting example, user device 124 may receive verification alert as remote device 140 verifies location of entity 116 using location identifying component 136. In some embodiments, processor 104 may be configured to store scanning data generated every time a user or third-party scans unique identifier 128; for example, processor 104 may store the data in a database. In a non-limiting example, a user may track who and what time scanned unique identifier 128, or the like. For the purposes of this disclosure, "scanning data" is information related to scanning of a unique identifier. In some embodiments, scanning data may include a time of scan, device ID, a photograph, a message, and the like. As a non-limiting example, scanning data may include information related to a third party or remote device 140 that scanned unique identifier 128, time or method third party or remote device 140 scanned unique identifier 128, or the like. In some embodiments, a user may access the database and review all prior scanning data.

With continued reference to FIG. 1, in some embodiments, processor 104 may be configured to authenticate a user device 124 using a user credential using an authentication module. For the purposes of this disclosure, an "authentication module" is a component or system that verifies the identity of users or third parties. Authentication module may include any suitable software and/or hardware as described in the entirety of this disclosure. In a non-limiting embodiment, authentication module may manipulate any information of the entirety of this disclosure to be displayed to a user or third party with varying authority or accessibility. A "user credential" as described in the entirety of this disclosure, is a datum representing an identity, attribute, code, and/or characteristic specific to a user or user device. For example, and without limitation, the authentication credential may include a username and password unique to user or a or user device 124. The username and password may include any alpha-numeric character, letter case, and/or special character. In some embodiments, user credential may include biometric data. For example, and without limitation, biometric data may include fingerprints, iris patterns, facial recognition, or the like. In a non-limiting example, user credential may include unique identifier of user device 124. For example, and without limitation, user may scan unique identifier of user device 124 to authenticate the user or user device 124. In another non-limiting example, user credential may include unique identifier of remote device 140. For example, and without limitation, third party may scan unique identifier of remote device 140 to authenticate the third party or remote device 140.

Figure 2B:
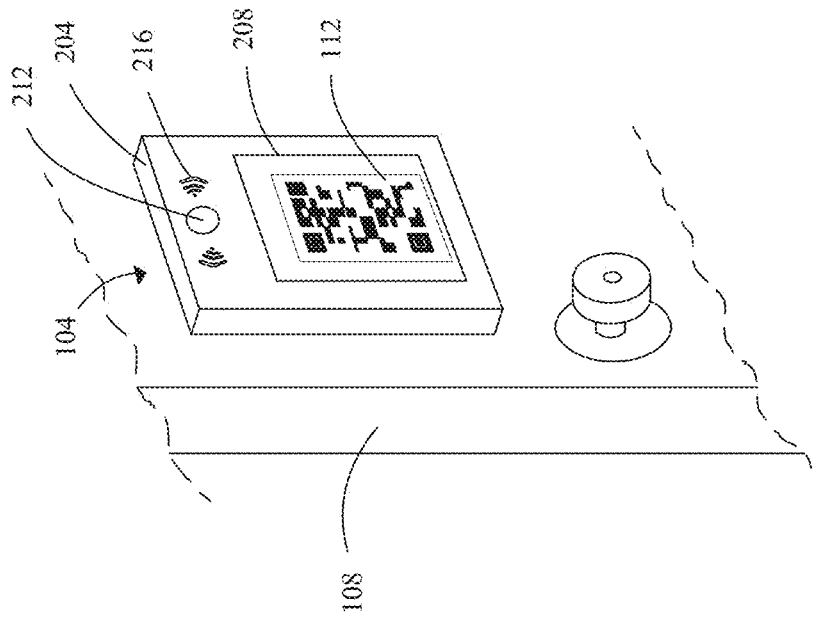
FIGS. 2A-B illustrate exemplary embodiments of a location identifying component.
Figure 2A:
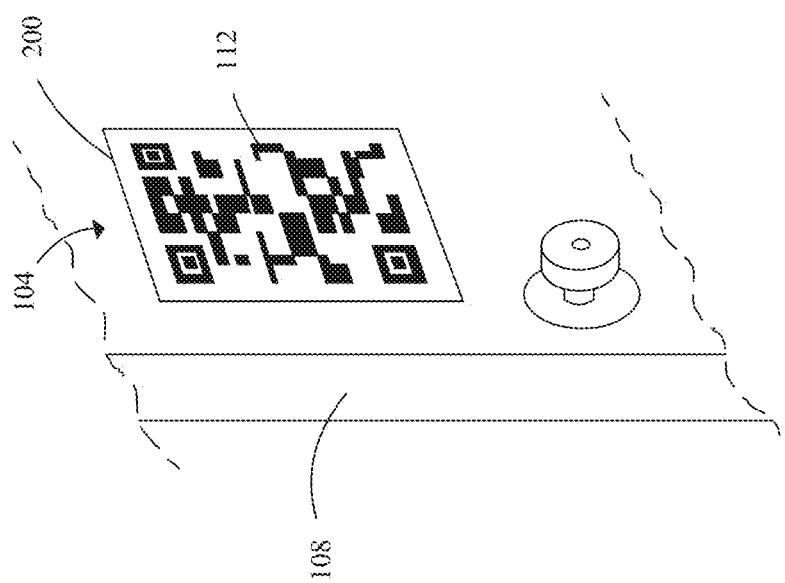

Referring now to FIGS. 2A-B, exemplary configurations of location identifying component 136 are illustrated. As shown in FIG. 2A, location identifying component 136 may include a laminated paper 200 with unique identifier 128 printed on the paper 200. As shown in FIG. 2B, location identifying component 136 may include a housing 204, display 208, camera 212, speaker 216, and the like. In a non-limiting example, location identifying component 136 may display unique identifier 128 using display 208. For example, and without limitation, unique identifier 128 may be constantly displayed on display 208 of location identifying component 136 or a user or third party may engage with display 208 of location identifying component 136 through tactile interaction, such as touch or pushing a button, in order to access and view unique identifier 128. In some embodiments, location identifying component 136 may output or transmit location data 120 or user data 112 of user profile 132 using speaker 216. As a non-limiting example, location identifying component 136 may output location data 120 when a user or third party engages with location identifying component 136 through tactile interaction, such as touch or pushing a button, in order to access or obtain location data 120 or user data 112. For example, and without limitation, when a third party pushes a button of location identifying component 136, a location (location data 120) of entity 116 and instruction for delivery (communication data of user data 112) may be outputted from speaker 216. In some embodiments, location identifying component 136 may recognize user or third party's face, or any biometric data using camera 212. In some embodiments, location identifying component 136 may scan unique identifier of user device 124 or remote device 140 using camera 212.

Figure 3:
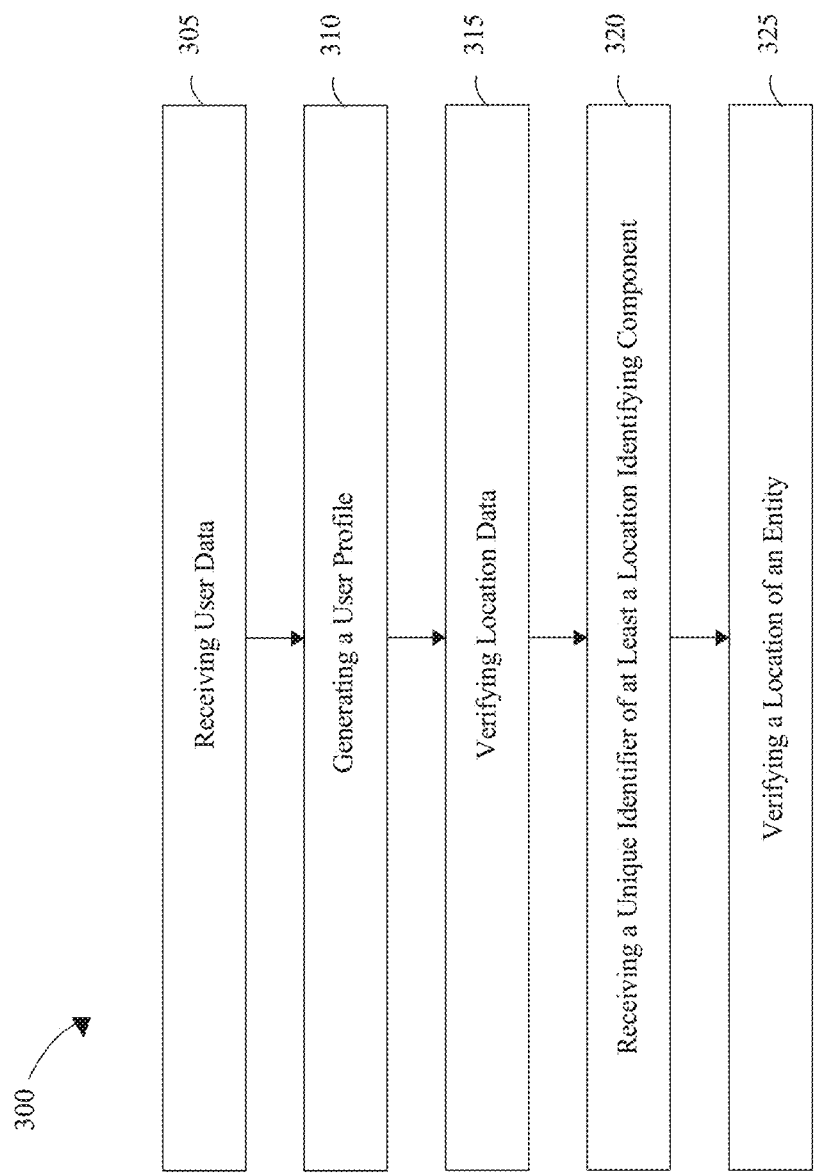
FIG. 3 illustrates a flow diagram of an exemplary method of verifying a location of an entity.

Referring now to FIG. 3, a flow diagram of an exemplary method 300 of verifying a location of an entity. Method 300 includes a step 305 of receiving, using at least a processor, user data related to an entity from the first location verifying device, wherein the user data comprises location data. In some embodiments, the user data may further include communication data. These may be implemented as disclosed with respect to FIGS. 1-2B.

With continued reference to FIG. 3, method 300 includes a step 310 of generating, using at least a processor, a user profile as a function of user data. This may be implemented as disclosed with respect to FIGS. 1-2B.

With continued reference to FIG. 3, method 300 includes a step 315 of verifying, using at least a processor, location data of a user profile. This may be implemented as disclosed with respect to FIGS. 1-2B.

With continued reference to FIG. 3, method 300 includes a step 320 of receiving, using at least a processor, a unique identifier of at least a location identifying component, wherein the unique identifier is associated with location data of a user profile. In some embodiments, the location identifying component may include an electromagnetic code device. This may be implemented as disclosed with respect to FIGS. 1-2B.

With continued reference to FIG. 3, method 300 includes a step 325 of verifying, using at least a processor, a location of the entity by comparing geolocation data of a user device the location data associated with a unique identifier. In some embodiments, method 300 may further include transmitting, using the at least a processor, the location data as a function of the unique identifier to a remote device. In some embodiments, method 300 may further include verifying, using the at least a processor, a location of the remote device as a function of the location data and geolocation data of the remote device. In some embodiments, method 300 may further include verifying, using the at least a processor, the location of the remote device by comparing an interaction address and the location data associated with the unique identifier. In some embodiments, method 300 may further include controlling, using the at least a processor, a locking mechanism of the entity as a function of the verification of the location of the remote device. In some embodiments, method 300 may further include generating, using the at least a processor, a verification alert as a function of the verification. In some embodiments, method 300 may further include authenticating, using the at least a processor, the user device using a user credential. In some embodiments, method 300 may further include verifying, using the at least a processor, a first location of the location of a first entity of the entity and verifying, using the at least a processor, a second location of the location of a second entity of the entity. This may be implemented as disclosed with respect to FIGS. 1-2B.

It is to be noted that any one or more of the aspects and embodiments described herein may be conveniently implemented using one or more machines (e.g., one or more computing devices that are utilized as a user computing device for an electronic document, one or more server devices, such as a document server, or the like). programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
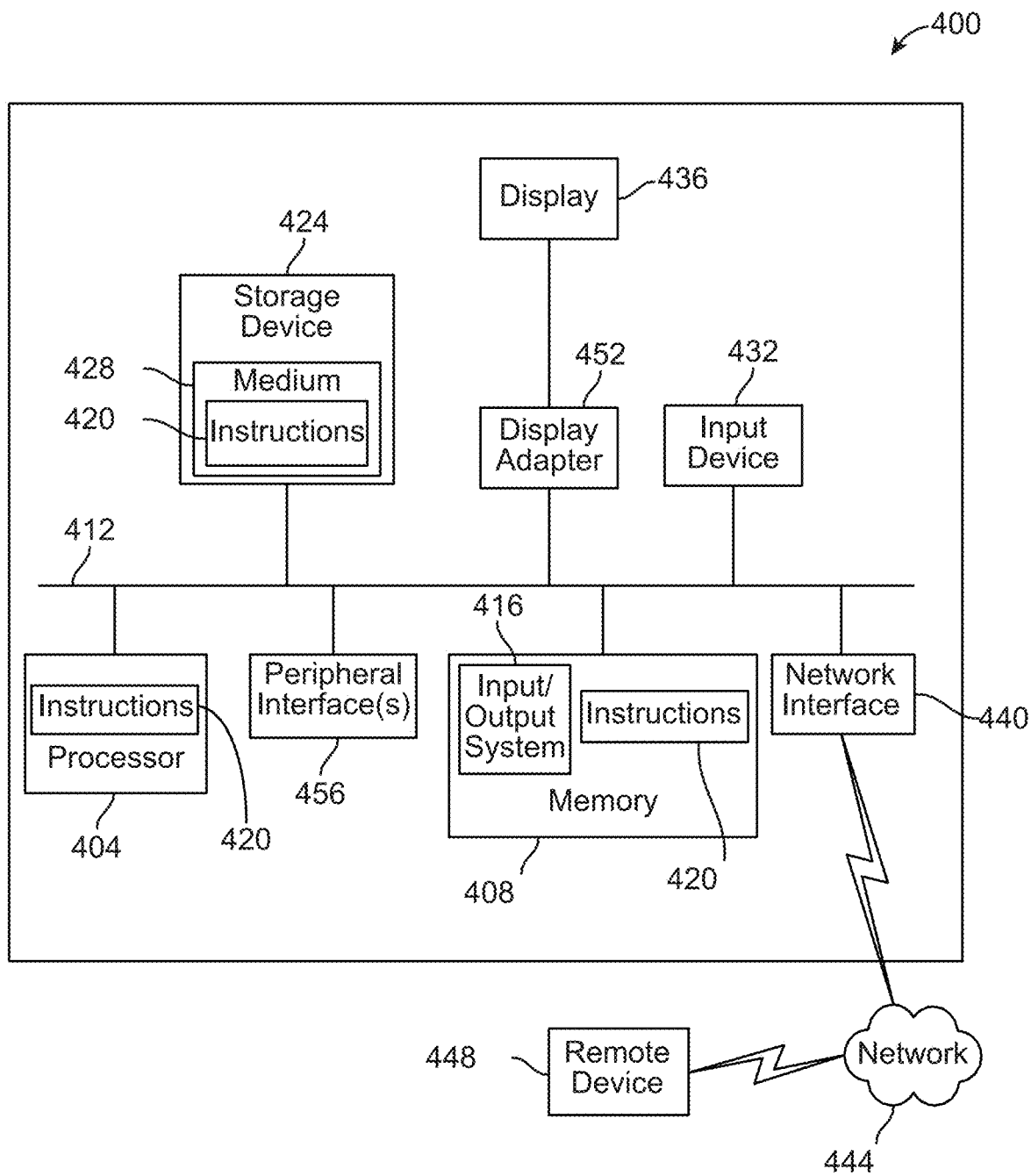
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and memory 408 that communicate with each other, and with other components, via a bus 412. Bus 412 may include any of several types of bus structures including, but not limited to, memory bus, memory controller, a peripheral bus, a local bus, and any combinations thereof, using any of a variety of bus architectures.

Processor 404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 404 may be organized according to Von Neumann and/or Harvard architecture as a non-limiting example. Processor 404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of verifying a location of an entity comprising a locking mechanism controlling access to a protected area, a memory configured to store location data, and electronics configured to control the locking mechanism, wherein the method comprises:
   receiving, using at least a processor, user data related to purchasing and ordering the entity, wherein the user data comprises the location data corresponding to a delivery address provided during the purchasing and ordering;
   generating, using the at least a processor, a user profile as a function of the user data;
   verifying, using the at least a processor, the location data of the user profile;
   storing the verified location data in the memory of the entity;
   receiving, using the at least a processor, a unique identifier of at least a location identifying component, wherein the unique identifier is associated with the location data of the user profile;
   verifying, using the at least a processor, the delivery location by comparing geolocation data of a user device and the verified location data stored in the memory and associated with the unique identifier;
   receiving, by a remote device, an interaction address corresponding to the delivery address;
   determining if the remote device is located at the delivery address by comparing the interaction address received by the remote device with the verified location data stored in the memory of the entity;
   and when the determining indicates that the remote device is located at the delivery address, controlling the locking mechanism to provide the access to the protected area.

2. The method of claim 1, wherein the user data further comprises communication data.

3. The method of claim 1, further comprising:
   transmitting, using the at least a processor, the location data as a function of the unique identifier to a remote device.

4. The method of claim 3, further comprising:
   verifying, using the at least a processor, a location of the remote device as a function of the location data and geolocation data of the remote device.

5. The method of claim 4, further comprising:
   verifying, using the at least a processor, the location of the remote device by comparing an interaction address and the location data associated with the unique identifier.

6. The method of claim 4, further comprising:
   controlling, using the at least a processor, a locking mechanism of the entity as a function of the verification of the location of the remote device.

7. The method of claim 1, further comprising:
   generating, using the at least a processor, a verification alert as a function of the verification.

8. The method of claim 1, further comprising:
   authenticating, using the at least a processor, the user device using a user credential.

9. The method of claim 1, wherein the location identifying component further comprises an electromagnetic code device.

10. The method of claim 1, further comprising:
    verifying, using the at least a processor, a first location of the location of a first entity of the entity; and
    verifying, using the at least a processor, a second location of the location of a second entity of the entity.

11. A location verification system, wherein the location verification system comprises:
    an entity comprising:
      a locking mechanism for controlling access to a protected area,
      electronics configured to control the locking mechanism,
      at least a processor configured to control the electronics,
      and a memory communicatively connected to the at least a processor;
    wherein the memory contains location data and instructions configured the at least a processor to:
      receiving, user data related to purchasing and ordering the entity, wherein the user data comprises the location data corresponding to a delivery address provided during the purchasing and ordering;
      generating a user profile as a function of the user data;
      verifying the location data of the user profile;
      storing the verified location data in the memory of the entity;
      receiving a unique identifier of at least a location identifying component, wherein the unique identifier is associated with the location data of the user profile;
      verifying the delivery location by comparing geolocation data of a user device and the verified location data stored in the memory and associated with the unique identifier;
      receiving an interaction address corresponding to the delivery address;

determining if the remote device is located at the delivery address by comparing the interaction address received by the remote device with the verified location data stored in the memory of the entity;

and when the determining indicates that the remote device is located at the delivery address, controlling the locking mechanism to provide the access to the protected area.

12. The system of claim 11, wherein the user data further comprises communication data.

13. The system of claim 11, wherein the memory contains instructions further configuring the at least a processor to transmit the location data as a function of the unique identifier to a remote device.

14. The system of claim 13, wherein the memory contains instructions further configuring the at least a processor to verify a location of the remote device as a function of the location data and geolocation data of the remote device.

15. The system of claim 14, wherein the memory contains instructions further configuring the at least a processor to verify the location of the remote device by comparing an interaction address and the location data associated with the unique identifier.

16. The system of claim 14, wherein the memory contains instructions further configuring the at least a processor to control a locking mechanism of the entity as a function of the verification of the location of the remote device.

17. The system of claim 11, wherein the memory contains instructions further configuring the at least a processor to generate a verification alert as a function of the verification.

18. The system of claim 11, wherein the memory contains instructions further configuring the at least a processor to authenticate the user device using a user credential.

19. The system of claim 11, wherein the location identifying component further comprises an electromagnetic code device.

20. The system of claim 11, wherein the memory contains instructions further configuring the at least a processor to:
 verify a first location of the location of a first entity of the entity; and
 verify a second location of the location of a second entity of the entity.

* * * * *